United States Patent [19]
Turner et al.

[11] Patent Number: 5,426,797
[45] Date of Patent: Jun. 27, 1995

[54] CRIB FRAME ASSEMBLY

[75] Inventors: Dennis M. Turner, Scipio; Alvin Fowler, Columbus, both of Ind.

[73] Assignee: Cosco, Inc., Columbus, Ind.

[21] Appl. No.: 130,212

[22] Filed: Oct. 1, 1993

[51] Int. Cl.6 ..................... A47C 19/00; A47D 7/00
[52] U.S. Cl. .................................. 5/93.1; 5/53.1;
5/283; 403/13; 403/281; 403/388; 403/231;
403/260; D6/508
[58] Field of Search ............... 5/93.1, 53.1, 201, 100,
5/282.1, 286; 403/13, 281, 388, 231, 260;
D6/394, 395, 507, 508

[56] References Cited

U.S. PATENT DOCUMENTS

| D. 36,606 | 10/1903 | Woodruff | 5/53.1 |
|---|---|---|---|
| 911,863 | 2/1909 | Adams | 5/283 R |
| 960,340 | 6/1910 | Kimball | 5/283 R |
| 998,582 | 7/1911 | Lucas | 5/283 R |
| 1,070,814 | 8/1913 | Kimball | 5/283 R |
| 1,114,486 | 10/1914 | Kimball | 5/283 R |
| 1,352,594 | 9/1920 | Gail | 5/283 R |
| 4,386,870 | 6/1983 | Baroody | 403/260 |
| 5,230,581 | 7/1993 | Deng | 403/260 |

OTHER PUBLICATIONS

"Cribs", 1987 Cosco Catalog, one page.

*Primary Examiner*—Alexander Grosz
*Attorney, Agent, or Firm*—Barnes & Thornburg

[57] ABSTRACT

An end frame assembly includes an outer frame, a lower support attached to the outer frame, and a plurality of spindles attached between the outer frame and the lower support. Heat deformable connectors are disposed between the outer frame and the lower support subsequent to painting the outer frame, lower support, and spindles. A plurality of rivets are used to connect the outer frame to selected spindles.

21 Claims, 4 Drawing Sheets

CRIB FRAME ASSEMBLY

BACKGROUND AND SUMMARY OF THE INVENTION

The present invention relates to a crib frame assembly and, particularly, to a painted metal end frame assembly for use with such things as a bed, crib, and changing table. More particularly, the present invention relates to a painted end frame assembly, components of which are formed and painted prior to connection of the components together into an end frame assembly.

Metal end frame assemblies for use with such things as beds, cribs, and changing tables are known. These end frames provide structural support to the item to which the end frame is attached. In addition, the aesthetic qualities of beds, cribs, and changing tables can be enhanced by forming components of the end frames into decorative shapes and/or painting these components.

Conventional metal end frame assemblies are often welded together. This makes multi-colored painting of end frame assemblies difficult and expensive. Welding painted metal components of an end frame assembly together after they have been painted burns some of this paint off.

Trying to paint individual components of an end frame assembly different colors after they have been welded together is expensive and time consuming. End frame assembly components of one color must be masked before other components are painted a different color. This masking must then be removed which adds additional time and expense to the painting process. Further, removal of masking is a messy process that can sometimes leave masking and adhesive behind on components of an end frame. If this masking and adhesive cannot be removed, the end frame assembly must either be disposed of or disassembled with the destroyed component or components removed. The end frame assembly must then be subsequently reassembled and painted. A multi-colored metal end frame assembly that could be produced without the above-described difficulties associated with current production techniques would be a welcome improvement.

Accordingly, the present invention includes a metal end frame assembly formed from dissimilar materials. The metal end frame assembly includes a metal outer frame that is bent into a predetermined shape. The outer frame includes a top portion and a pair of downwardly extending legs.

The metal end frame assembly further includes a metal lower support for attachment between the downwardly extending legs of the outer frame. The lower support is attached to the outer frame by a pair of holes punched through the downwardly extending legs of the outer frame and connectors and fasteners. Each connector has a first end which is inserted into an opening formed in the lower support. A second end of each connector has a fish mouth formed on it that engages an outer periphery of a downwardly extending leg of the outer end frame. An insert such as a spider nut is disposed within the cavity of the lower supports behind each fish mouth connector. A fastener such as a threaded screw or bolt is inserted into the holes formed in the downwardly extending legs of the outer frame. The fastener threadingly engages both the fish mouth connector and the insert to connect the lower support to the outer frame. The connector is made from a heat deformable plastic such as polypropylene.

The end frame assembly further includes a plurality of metal spindles that are mounted to lie between the top portion of the outer frame and the lower support. The spindles are formed into such shapes as a trombone slide in addition to also being formed to be substantially straight. The trombone spindles have downwardly extending legs that are trapped in apertures or openings formed in lower support. These apertures or openings in lower support have a substantially identical shape to the outer periphery of the downwardly extending legs of the trombone spindles. The trombone spindles further include a top portion located between the downwardly extending legs of the trombone spindles.

The trombone spindles are attached to the outer frame by fasteners designed to reduce rotation of the spindles by, for example, a child. The fasteners include a shoulder rivet and a pop rivet for each of the trombone spindles. The shoulder rivet connecting a trombone spindle to the top portion of the outer frame extends through apertures formed in first wall portions of both the top portion of the outer frame and trombone spindle. The pop rivet extends through first and second walls of the trombone spindle at a different location than the aperture for the shoulder rivet. In addition, an aperture is formed through the first wall of the top portion of the outer frame for the pop rivet at a different location than the aperture for the shoulder rivet. Portions of the first wall of the trombone spindle adjacent the first wall of the top portion of the outer frame are flattened so that they make direct contact with the adjacent first wall of the top portion.

First and second ends of the substantially straight spindles are swaged so that they have generally flat sides. At least one end of the substantially straight spindles has a double-D cross-section. At least one of the apertures formed in both the lower support and top portion of the outer frame also has a double-D shape. This allows straight spindles to be connected between the lower support and the top portion of the outer frame such that it is difficult to rotate them.

The top portion of the outer frame may be formed so that it has a predefined radius of curvature in order to give the end frame assembly a more decorative appearance. In those cases where the top portion of the outer frame is formed with a predefined radius of curvature, the lower support is also formed so as to substantially match the radius of curvature of the top portion of the outer frame. This allows the trombone spindles and substantially straight spindles to be formed of substantially equal length. Thus, a trombone spindle or generally straight spindle can be used at any location of attachment for a like-type spindle between the top portion of the outer frame and the lower support.

The process or method for making the end frame assembly involves preforming of the metal outer frame, lower support, and spindles in the shapes described above. Subsequent to formation of the metal components of the end frame assembly, they are painted in a paint kitchen having paint booths as is known in the art. The painting involves electrostatically powder coating the outer frame, lower support, and spindles with one or more colors. Subsequent to electrostatic powder coating, the paint is cured onto the surfaces of the components of the end frame assembly in a heat chamber. The above process can be used to produce a wide variety of differently shaped outer end frames, lower supports, and spindles. In addition, these outer frames, lower supports, and spindles can be of differing colors. These various shaped and colored components can then be connected together in various combinations to produce a wide variety of end frame assemblies having various pleasing shapes and colors.

The problems encountered with current manufacturing of painted metal end frame assemblies are avoided by the present invention. Because the components of the end frame assembly are connected together subsequent to painting by mechanical fastening, there is no problem with paint burn-off as with painted metal end frame assemblies that are welded together. Furthermore, no masking is required to produce painted and multi-colored end frame assemblies. Elimination of masking saves both time and expense as described above. The present invention thus reduces the ultimate cost that might otherwise be charged for beds, cribs, and changing tables that have multi-colored end frame assemblies attached to them.

Additional features and advantages of the invention will become apparent to those skilled in the art upon consideration of the following detailed description of a preferred embodiment of the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
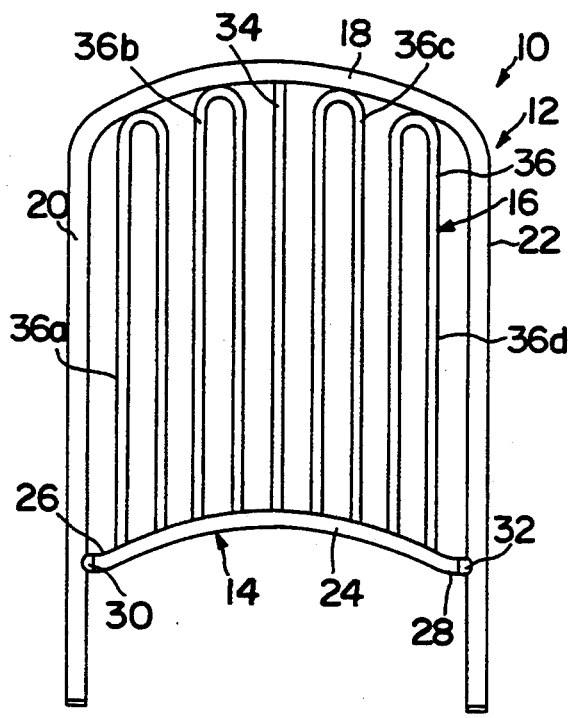
FIG. 1 is a side elevational view of an end frame assembly in accordance with the present invention.

A side elevational view of a painted metal end frame 10 of the present invention is shown in FIG. 1. End frame assembly 10 includes an outer frame 12, a lower support 14, and a plurality of spindles 16. Outer frame 12 is made from metal having a substantially circular cross-section. Outer frame 12 is bent into a predefined shape such as the general U-shape shown in FIG. 1. Outer frame 12 includes a top portion 18 and a pair of downwardly extending legs 20 and 22. As can be seen in FIG. 1, top portion 18 of outer frame 12 has a generally arcuate shape with a predetermined radius of curvature.

Illustratively, metal end frame 10 is a multi-colored unit. Outer frame 12 and lower support 14 are light blue, center spindle 34 and outside trombone spindles 36a and 36d are pink, and inside trombone spindles 36b and 36c are mint green. The method of the present invention makes it easy to produce multi-colored metal end frames economically.

Lower support 14 is formed from a metal and also has a substantially circular cross-section. Lower support 14 is attached between downwardly extending legs 20 and 22 of outer frame 12. As can be seen in FIG. 1, lower support 14 has a central portion 24 that is generally arcuate in shape. Arcuate portion 24 has a radius of curvature that is substantially equal to the radius of curvature of top portion 18. Forming top portion 18 and lower support 16 with substantially identical radii of curvature allows like-shaped spindles 16 to be of substantially identical length. This has the advantage of reducing the number of components and forming steps necessary for construction of end frame assembly 10.

Figure 2:
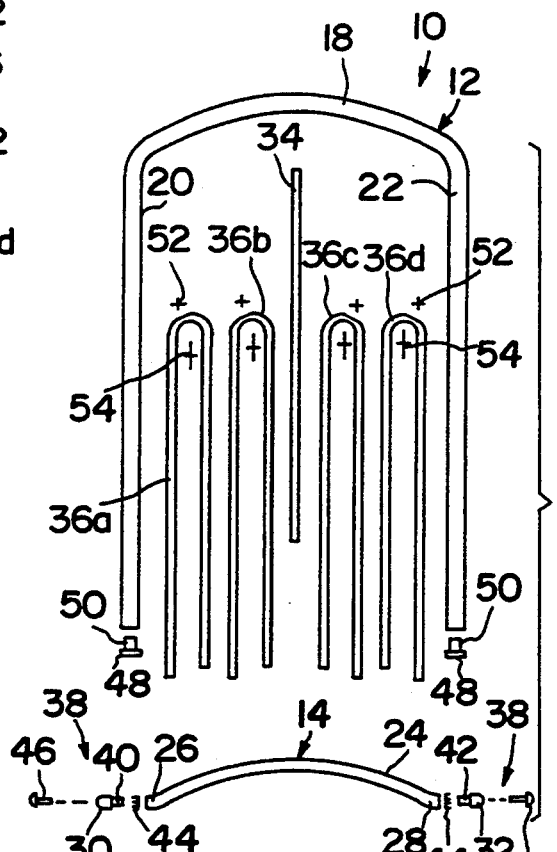
FIG. 2 is an exploded side elevational view of the end frame assembly of FIG. 1.

Lower support 14 is also formed to include substantially straight end portions 26 and 28 that flank both ends of arcuate portion 24 as shown in FIGS. 1 and 2. Substantially straight portions 26 and 28 of lower support 14 receive connectors 30 and 32, portions of which are respectively disposed in cavities formed in substantially straight portions 26 and 28. Connectors 30 and 32 lie respectively adjacent downwardly extending legs 20 and 22.

Metal spindles 16 are formed to include substantially straight spindles 34 and trombone spindles 36. Straight spindles 34 and trombone spindles 36 are connected between top portion 18 of outer frame 12 and lower support 14 as discussed below in more detail.

An exploded side elevational view of end frame assembly 10 is shown in FIG. 2. As can be seen in FIG. 2, lower support 14 is attached between downwardly extending legs 20 and 22 with connectors 30 and 32 and mechanical fastening structure 38. Connectors 30 and 32 have respective plug ends 40 and 42 that are disposed in cavities formed in substantially straight portions 26 and 28 of lower support 14. Mechanical fastening structure 38 includes inserts 44 that are disposed in the cavities formed in substantially straight portions 26 and 28 behind plug ends 40 and 42. Fasteners 46, such as threaded screws or bolts, are disposed through apertures formed in downwardly extending legs 20 and 22. Fasteners 46 pass through apertures formed in connectors 30 and 32 and threadingly engage inserts 44 to lockingly connect lower support 14 to outer frame 12.

Coasters 48 are shown as having plug portions 50 formed thereon that are disposed in cavities formed in downwardly extending legs 20 and 22. Coasters 48 help prevent damage to flooring or carpet on which outer frame 12 of end frame assembly 10 rests.

Straight spindle 34 is connected between top portion 18 of outer frame 12 and lower support 14 by apertures formed therein as will be discussed in more detail below in connection with FIG. 6. Trombone spindles 36 are connected between top portion 18 of outer frame 12 and lower support 14 via a combination of spindle-receiving apertures formed in both lower support 14 and top portion 18 and shoulder rivets 52 and pop rivets 54 as will be discussed in more detail in connection with FIGS. 4 and 5.

Figure 3:
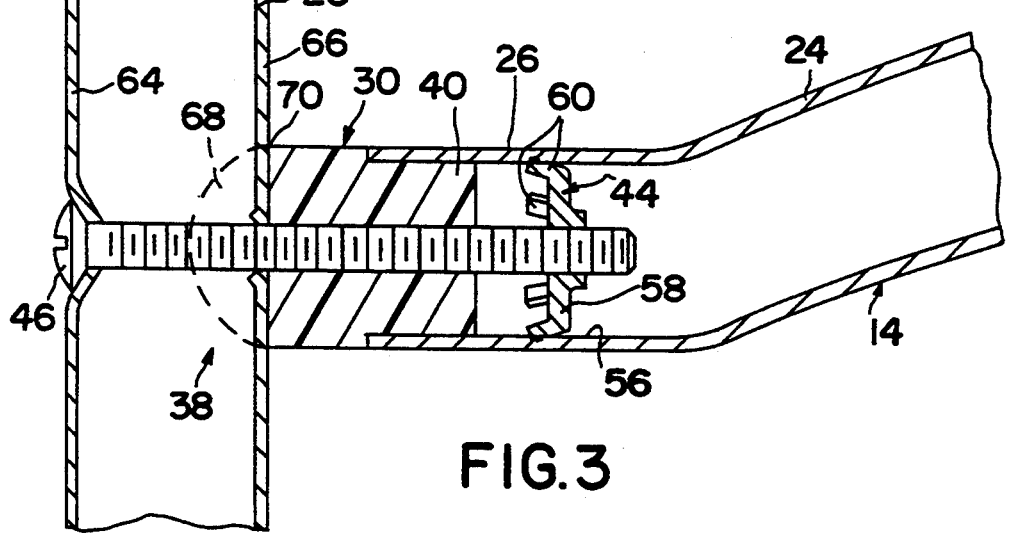
FIG. 3 is an enlarged cross-sectional view of a connection point of an outer frame and lower support of the end frame assembly of FIG. 1.

An enlarged view of the connection point of lower support 14 with downwardly extending leg 20 is shown in FIG. 3. As can be seen in FIG. 3, both substantially straight portion 26 and arcuate portion 24 of lower support 14 are formed from a metal member having a cavity 56 therein. Insert 44 and plug end 40 of connector 30 are disposed within cavity 56. Although not shown, plug end 42 and a corresponding insert 44 are also disposed in cavity 56 that is formed in substantially straight portion 28.

Insert 44 is shown as a spider nut 58 having a plurality of outwardly projecting legs 60 that anchor it in cavity 56 of substantially straight portion 26 of lower support 14. Downwardly extending leg 20 is shown as being formed to include a cavity 62. An aperture is formed through walls 64 and 66 of downwardly extending leg 20 through which fastener 46 is disposed. Fastener 46 passes through connector 30 and threadingly engages spider nut 58 so as to attach lower support 14 to outer frame 12. As can be seen in FIG. 3, connector 30 has a fish mouth portion 68 that lies adjacent a portion of the periphery 70 of downwardly extending leg 20. Although not shown, connector 42 also has a fish mouth portion 68 that engages a periphery of downwardly extending leg 22.

Figure 8:
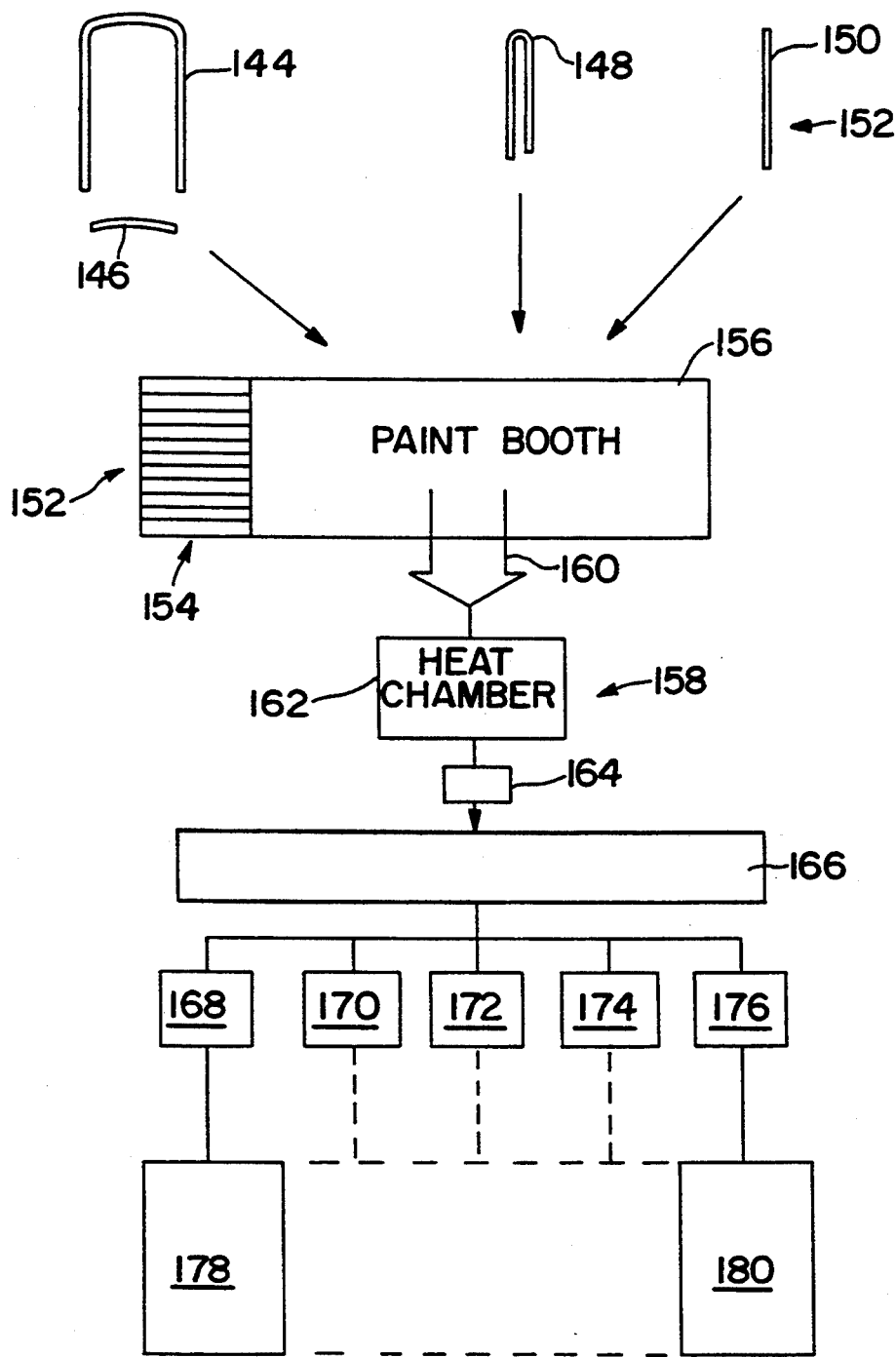
FIG. 8 is a diagrammatic view of the process or method used to manufacture the painted metal end frame assembly of the present invention.

As discussed above, and as shown in FIG. 3, connectors 30 and 32 are formed from a material that is different than the material from which outer frame 12, lower support 14, and spindles 16 are formed. Specifically, connectors 30 and 32 are formed from a plastic, such as polypropylene, and outer frame 12, lower support 14, and spindles 16 are formed from a metal. The plastics material from which connectors 30 and 32 are formed has a melting point temperature that is less than the temperature required to cure paint that is electrostatically powder coated on outer frame 12, lower support 14, and spindles 16 as discussed below in connection with FIG. 8.

Figure 4:
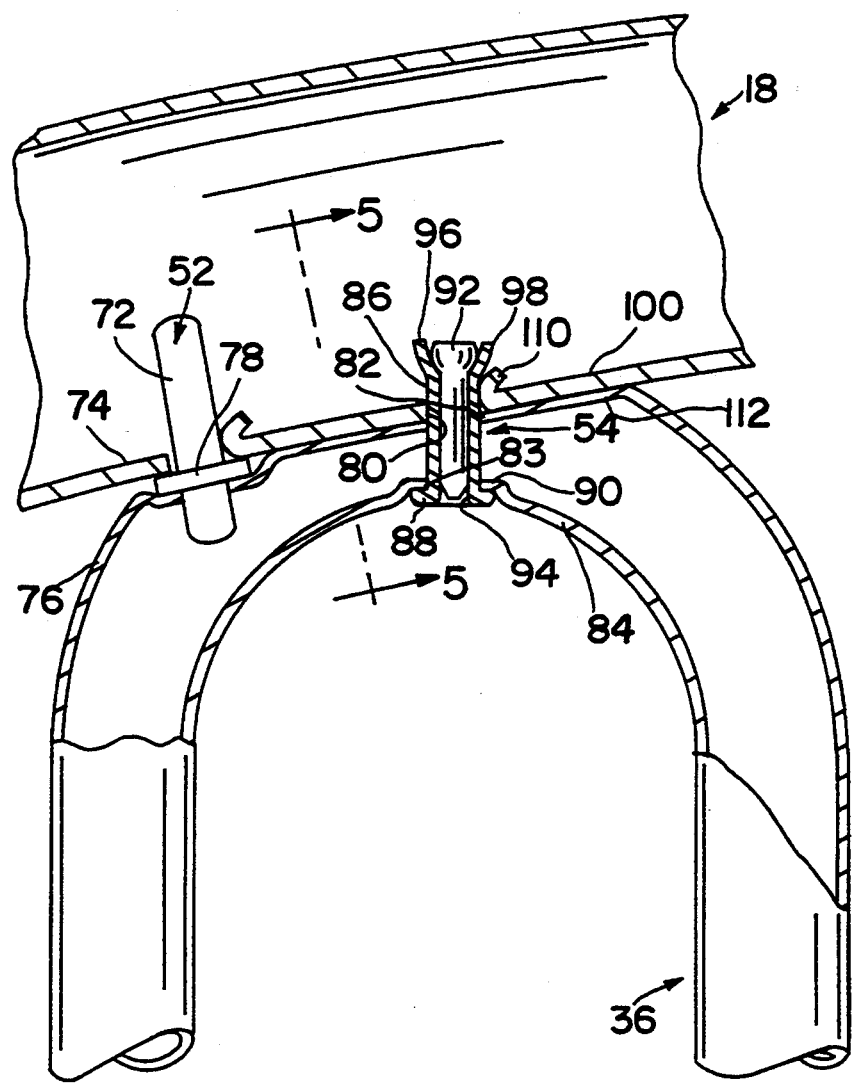
FIG. 4 is an enlarged cross-sectional view of a connection point of an outer frame and trombone spindle of the present invention.
Figure 5:
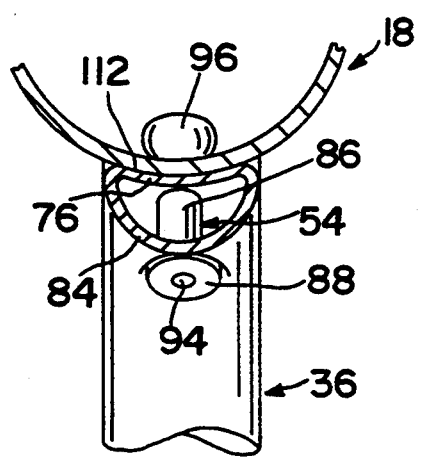
FIG. 5 is a cross-sectional view taken along line 5—5 of FIG. 4 showing a frame and spindle connection point.

An enlarged cross-sectional view of the connection of a trombone spindle 36 with top portion 18 of outer frame 12 is shown in FIG. 4. Trombone spindles 36 are connected to top portion 18 of outer frame 12 using the above-described shoulder rivet 52 and pop rivet 54. Rivets 52 and 54 attach trombone spindles 36 to top portion 18 so that they are not easily rotated, for example, by a child. Shoulder rivet 52 includes an elongated pin portion 72 that extends through apertures formed in first walls 74 and 76 of respective top portion 18 and trombone spindle 36. A flange 78 of shoulder rivet 52 is disposed between first walls 74 and 76. As can be seen in FIG. 4, the portion of first wall 76 of trombone spindle 36 adjacent flange 78 is flattened along the width of flange 78.

Pop rivet 54 is shown as being disposed through an aperture 80 formed in first wall 74 of top portion 18 as well as through an aperture 82 through first wall 76 and aperture 83 through second wall 84 of trombone spindle 36. Pop rivet 54 includes a body portion 86 that extends through apertures 80, 82, and 83. A head 88 is formed on body section 86 of pop rivet 54. Head 88 engages a flattened section 90 formed in second wall 84 of trombone spindle 36. A frangible or breakable nail 92 is disposed within an aperture 94 extending through pop rivet 54. Frangible nail 92 is pulled in a generally downward direction so as to create flared portions 96 and 98 of body section 86. Flared portions 96 and 98 engage interior surface 100 of first wall 74 to secure pop rivet 54 within aperture 80. A curled section 110 of first wall 74 of top portion 18 is formed during creation of aperture 80 in first wall 74. Curled section 110 engages flared portion 98 of body section 86 of pop rivet 84 to further secure it within aperture 80.

As can be seen in FIG. 4, a portion 112 of first wall 76 of trombone spindle 36 that lies adjacent first wall 74 of top portion 18 is formed substantially concaved so as to generally conform with the dimensions of top portion 18. This gives end frame assembly 110 an overall more attractive appearance.

As discussed above, the combination of shoulder rivet 52 and pop rivet 54 helps reduce the extent to which trombone spindles 36 can be rotated by, for example, a child within a bed, crib, or changing table to which end frame assembly 10 is attached. The combination of shoulder rivet 52 and pop rivet 54 thus provide additional structural strength and integrity to end frame assembly 10. Flared portion 96 of body section 86 of pop rivet 54 is shown as is substantially concaved portion 112 of first wall 76 of trombone spindle 36.

Figure 6:
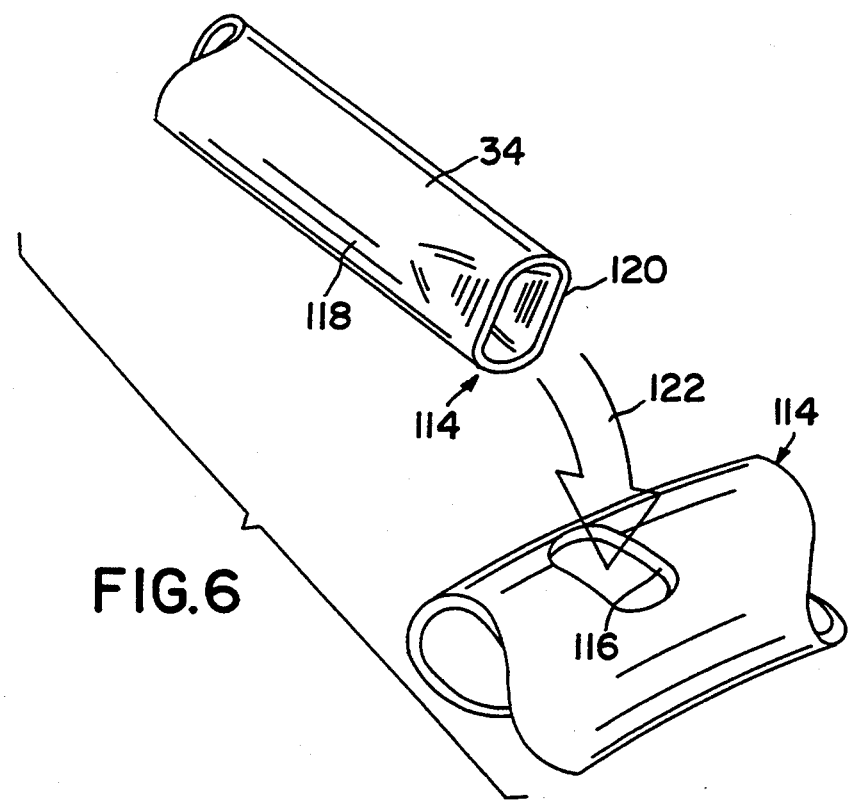
FIG. 6 is a view of a swaged double-D substantially straight spindle that is received in a double-D aperture formed in a lower support of the end frame assembly.

A perspective view of the connection of a double-D end 114 of straight spindle 34 with a double-D aperture 116 formed in lower support 14 is shown in FIG. 6. Double-D end 114 is formed on straight spindles 34 by swaging sides 118 and 120 of spindle 34 to a substantially flat cross-section near end 114. End 114 of spindle 34 is inserted into aperture 116 of lower support 14 in the direction generally indicated by large double arrow 122. The double-D end on straight spindle 34 combined with the double-D apertures lower support 14 combine to lock straight spindles 34 against rotation.

Figure 7:
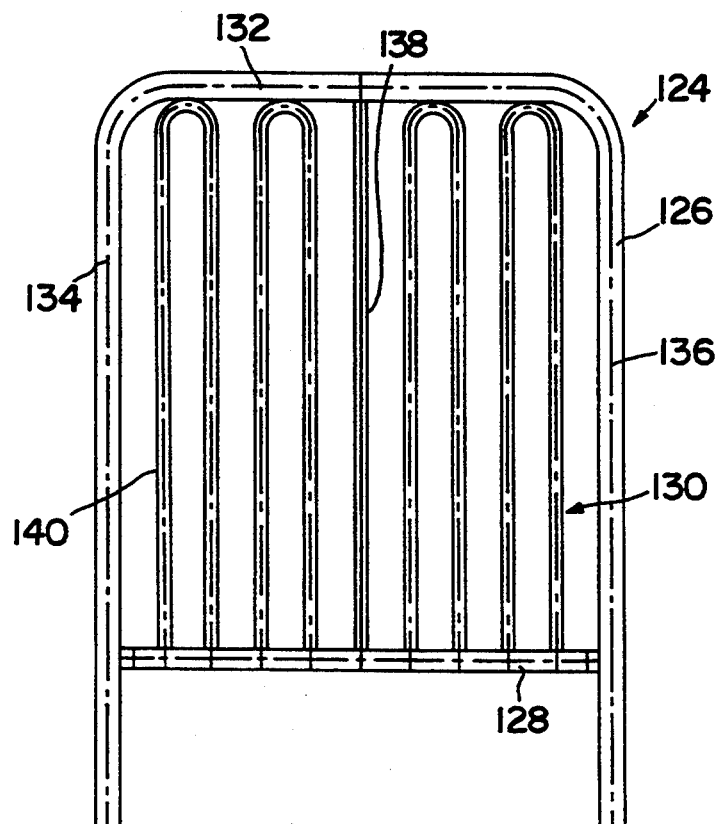
FIG. 7 is a side elevational view of an alternative embodiment of an end frame assembly in accordance with the present invention.

A side elevational view of another embodiment of an end frame assembly 124 of the present invention is shown in FIG. 7. End frame assembly 124 includes an outer frame 126, a lower support 128, and a plurality of spindles 130. Illustratively, end frame assembly 124 has the same spindle and frame color pattern as that described for end frame assembly 10.

Outer frame 126 is formed in a general U-shape and includes a top portion 132 and a pair of downwardly extending legs 134 and 136. Lower support 128 is connected between downwardly extending legs 134 and 136 as described above with regard to connection of lower support 14 to downwardly extending legs 20 and 22. A substantially straight spindle is connected between top portion 132 and lower support 128. This connection is the same as for straight spindle 34 to top portion 18 and lower support 14. That is, sides of straight spindle 138 adjacent its ends are swaged to a substantially flat shape so that one end has a double-D cross section. A double-D aperture is formed in lower support 128. Trombone spindles 140 are also attached between top portion 132 and lower support 128 via shoulder and pop rivets as discussed above. The antirotational connection of trombone spindles 140 to top portion 132 and lower support 128 is the same as that described above for trombone spindles 36.

As can be seen in FIG. 7, top portion 132 is substantially flat. Lower support 128 is also shown as being substantially flat so as to correspond to the shape of top portion 132. As discussed above in connection with end frame assembly 10, this allows spindles 130 to be of substantially identical length such that only one length of straight spindle 138 and trombone spindle 140 need to be formed as components of end frame assembly 124. This has the advantage of reducing the number of components and forming steps necessary for the construction of end frame assembly 124.

A diagrammatic view of the process or method used to construct end frame assemblies of the present invention is step one of the process generally indicated by reference numeral 142 involves preforming the metal components of an end frame assembly such as outer frames 144, lower supports 146, trombone spindles 148, and substantially straight spindles 150.

After preform step 142, components of the end frame assemblies are brought to a painting step generally indicated by reference numeral 152 where components of the end frame assembly are painted one or more colors. The painting step includes use of a paint kitchen 154 and paint booth generally designated by reference numeral 156. In the painting step 152, components of the end frame assembly are electrostatically powder-coated with the same or differing colors. As noted above, in one embodiment frame members 18, 24 are painted light blue, the inner trombone spindles 36b and 36a are painted mint green, and the center spindle 34 and outer trombone spindles 36a and 36d are painted pink.

Subsequent to electrostatic coating, the components are brought to a heating step generally designed by reference numeral 158 and large double arrow 160. The components of the end frame assemblies are heated in one or more heat chambers generally designated by reference numeral 162 to cure the electrostatically powder-coated paint on their surfaces. Subsequent to curing, lower supports 146 have inserts, like those designated by reference numeral 44 in FIG. 3, inserted into cavities formed in the ends of lower supports 146. This step is generally indicated by reference numeral 164.

Subsequent to step 164, plug end portions of connectors, like 30 and 32 illustrated in FIG. 3, are disposed in cavities of lower supports 146 through open ends in the supports 146. This step is generally indicated by reference numeral 166.

The outer frames 144, lower supports 146, trombone spindles 148, and substantially straight spindles 150 are then connected together in various combinations generally indicated by reference numerals 168 through 176 to produce completed end frame assemblies generally indicated by reference numerals 178 and 180 having various color and shape combinations. The curved portions of trombone spindles 148 are coupled to the frame using fasteners and the bottom portions of trombone spindles are trapped in apertures formed in the lower support.

Although the invention has been described in detail with reference to certain preferred embodiments, variations and modifications exist within the scope and spirit of the invention as described and defined in the following claims.

We claim:

1. An end frame assembly formed from dissimilar materials comprising
    an outer frame painted by electrostatic powder-coating and heating,
    a lower support attached between said outer frame, said lower support being painted by electrostatic powder coating and heating,
    a plurality of spindles attached between said outer frame and said lower support, said spindles being painted by electrostatic powder coating and heating,
    heat deformable connectors that are disposed between said outer frame and said lower support subsequent to painting of said outer frame, said lower support and spindles, and
    means for connecting said outer frame to said lower support, said connecting means including a fastener that is disposed through said heat deformable connectors.

2. The end frame assemblies of claim 1, wherein said deformable connectors each include a first end that is disposed in a cavity of said lower support and a second end having a fish mouth formed thereon that engages a periphery of said outer frame.

3. An end frame assembly comprising
    an outer frame,
    a lower support attached between said outer frame,
    a plurality of fasteners for attaching said lower support to said outer frame,
    a substantially straight spindle attached between said outer frame and said lower support,
    first means for attaching said substantially straight spindle to said outer frame and said lower support so as to reduce rotation of said substantially straight spindle,
    a trombone slide-shaped spindle attached between said outer frame and said lower support, and
    second means for attaching said trombone slide-shaped spindle to said outer frame and said lower support so as to reduce rotation of said trombone slide-shaped spindle, said second means including a plurality of rivets connecting said outer frame to said trombone slide-shaped spindle.

4. The end frame assembly of claim 3, wherein said first means includes double-D shaped ends formed on said substantially straight spindle that are disposed in double-D apertures formed in said outer frame and said lower support.

5. An end frame assembly comprising
    a frame having a top portion and first and second legs appended to the top portion,
    a frame support,
    a heat-cured paint coating on each of the frame and the frame support, the heat-cured paint coating having a predetermined melting point temperature, and
    means for coupling the frame support to the legs of the frame, the coupling means including a connector between the frame support and each leg, each connector being made of a material having a melting point temperature lower than the predetermined melting point temperature of the heat-cured paint coating on each of the frame and frame support.

6. The end frame assembly of claim 5, wherein the coupling means further includes a nut coupled to one end of the frame support and bolt means for engaging the nut to anchor the frame support to the first leg, the first leg is formed to include a first bolt-receiving aperture adjacent to the frame support, and the bolt means is positioned to extend through the first bolt-receiving aperture formed in the first leg and engage the nut coupled to the frame support.

7. The end frame assembly of claim 6, wherein the frame support is formed to include a cavity having a mouth communicating with the first bolt-receiving aperture formed in the first leg, the nut is mounted in a fixed position inside the cavity in spaced-apart relation to the first leg, a first of the connectors is anchored in the cavity of the frame support and positioned to lie between the nut and the first leg, the first of the connectors is formed to include a second bolt-receiving aperture, and the bolt means extends from the first leg to the nut through the second bolt-receiving aperture.

8. The end frame assembly of claim 7, wherein each nut includes a body portion formed to include an opening receiving the bolt means and a plurality of legs projecting away from the body portion and engaging an interior wall of the frame support.

9. The end frame assembly of claim 5, wherein each leg is a tubular member having an annular exterior wall and each connector includes a first end coupled to the frame support and a second end formed to include jaw means for defining a fishmouth connection engaging the annular exterior wall of one of the legs.

10. The end frame assembly of claim 5, further comprising a plurality of spindles interconnecting the top portion of the frame and the frame support and means for mechanically coupling each spindle to the top portion of the frame and to the frame support.

11. An end frame assembly comprising
a frame having a pair of legs and a top portion interconnecting the legs, the top portion formed to include a shoulder rivet aperture and a pop rivet aperture,
a frame support attached to the legs,
a trombone slide-shaped spindle having a first wall formed to include a shoulder rivet aperture and a pop rivet aperture and a second wall formed to include a pop rivet aperture,
a shoulder rivet having a pin and a flange, the pin extending through the shoulder rivet apertures in the first walls of the top portion and the trombone slide-shaped spindle and the flange lying between the first walls of the top portion and the trombone slide-shaped spindle, and
a pop rivet having a body formed to include a nail aperture and a frangible nail disposed in the nail aperture, the body extending through the pop rivet apertures in the first walls of the top portion and the trombone slide-shaped spindle and the pop rivet aperture in the second wall of the trombone slide-shaped spindle.

12. The end frame assembly of claim 11, wherein a portion of the first wall of the trombone slide-shaped spindle is substantially flat adjacent the flange of the shoulder rivet.

13. The end frame assembly of claim 11, wherein the first wall of the top portion is configured to include a curled section adjacent the pin of the shoulder rivet to secure the shoulder rivet within the shoulder rivet aperture in the first wall of the top portion.

14. The end frame assembly of claim 11, further comprising means for removing the frangible nail from the nail aperture of the body of the pop rivet so that flared portions are formed on the body adjacent an interior surface of the first wall of the top portion.

15. The end frame assembly of claim 14, wherein the pop rivet is configured to include a head extending beyond the pop rivet aperture formed in the second wall of the trombone slide-shaped spindle.

16. The end frame assembly of claim 15, wherein a portion of the second wall adjacent the head is substantially flat.

17. The end frame assembly of claim 14, wherein the first wall of the top portion is configured to include a curled section adjacent one of the flared portions of the body to further secure the pop rivet within the pop rivet aperture in the first wall of the top portion.

18. The end frame assembly of claim 11, wherein the first wall of the trombone slide-shaped spindle adjacent the first wall of the top portion generally conforms to the shape of the first wall of the top portion.

19. The end frame assembly of claim 11, further comprising a substantially straight spindle appended to the top portion and the frame support, the substantially straight spindle having first and second ends and swaged sides adjacent the first and second ends that are substantially flat in cross-section.

20. The end frame assembly of claim 19, wherein the top portion and the frame support are formed to include first and second end apertures that receive respective first and second ends of the substantially straight spindle and further wherein the first and second end apertures generally conform to the swaged sides of the substantially straight spindle.

21. The end frame assembly of claim 20, wherein the first and second ends have a double-D shape.

* * * * *